(12) United States Patent
Licata et al.

(10) Patent No.: US 11,946,512 B2
(45) Date of Patent: Apr. 2, 2024

(54) PULLEY FOR A MOTOR VEHICLE ENGINE

(71) Applicant: DAYCO EUROPE S.R.L., Chieti (IT)

(72) Inventors: Federico Domenico Licata, Chieti (IT); Alessio Courtial, Chieti (IT); Gregorio Luciani, Chieti (IT); Walter Ventura, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 0 days.

(21) Appl. No.: 17/760,382

(22) PCT Filed: Feb. 11, 2021

(86) PCT No.: PCT/IB2021/051131
§ 371 (c)(1),
(2) Date: Aug. 9, 2022

(87) PCT Pub. No.: WO2021/161213
PCT Pub. Date: Aug. 19, 2021

(65) Prior Publication Data
US 2023/0084509 A1    Mar. 16, 2023

(30) Foreign Application Priority Data

Feb. 11, 2020    (IT) .................. 102020000002686

(51) Int. Cl.
*F16D 11/14*    (2006.01)
*F16D 27/09*    (2006.01)
(Continued)

(52) U.S. Cl.
CPC .............. *F16D 11/14* (2013.01); *F16D 27/09* (2013.01); *F16D 27/105* (2013.01); *F16D 27/112* (2013.01)

(58) Field of Classification Search
CPC ........ F16D 11/14; F16D 27/09; F16D 27/105; F16D 27/112; F16D 2027/007
See application file for complete search history.

(56) References Cited

U.S. PATENT DOCUMENTS 9,140,314 B2 *    9/2015    Ikegawa ............... F16D 27/105

FOREIGN PATENT DOCUMENTS

| FR | 2765939 A1 | 1/1999 |
| WO | 2006056494 A1 | 6/2006 |
| WO | 2010004412 A1 | 1/2010 |

OTHER PUBLICATIONS

PCT/IB2021/051131, International Search Report and Written Opinion, dated Apr. 16, 2021 (13 pages).

* cited by examiner

*Primary Examiner* — Huan Le
(74) *Attorney, Agent, or Firm* — FisherBroyles, LLP; Susan M. Oiler (57) ABSTRACT

A pulley unit has a hub configured to be connected to a crankshaft, a pulley coaxial to the hub and supported in a rotationally free manner with respect thereto, a clutch interposed between the hub and the pulley, and an actuator for controlling the clutch, The clutch has an inner disc rotationally coupled to the hub and an engagement portion housed inside the pulley, a mobile member axially movable between an engagement position in which the mobile member rotationally couples the pulley to the engagement portion of the inner disc and a disengagement position in which the pulley is rotationally free with respect to the inner disc, and an elastic element acting on the mobile member to push it towards the engagement position.

20 Claims, 6 Drawing Sheets

(51) Int. Cl.
*F16D 27/105* (2006.01)
*F16D 27/112* (2006.01)

PULLEY FOR A MOTOR VEHICLE ENGINE

CROSS-REFERENCE TO RELATED APPLICATIONS

The present invention is filed under 35 U.S.C. § 371 as the U.S. National Phase of International Patent Application No. PCT/IB20201/051131, filed Feb. 11, 2021, which designated the United States and which claims the benefit of Italian patent application no. 102020000002686, filed on Feb. 11, 2020, the entire disclosure of which is incorporated herein by reference.

TECHNICAL FIELD

The present invention concerns a pulley unit for a motor vehicle, and in particular to a pulley unit comprising a decouplable pulley.

BACKGROUND ART

As is known, motor vehicle engines are generally provided with a belt accessory transmission comprising a pulley associated with the crankshaft and a plurality of pulleys associated with respective engine accessories such as, for example, an electric machine and a compressor for the on-board conditioning system.

In more recent engines, the electric machine is frequently of a reversible type, operating as a generator (alternator) or as a motor according to the operating conditions. In particular, when operating as a motor, the electric machine can provide a torque additional to that of the internal combustion engine, or alternative to it.

In hybrid applications, or in conventional applications in which a start-stop function is provided, there is the problem of driving the conditioning system compressor when the internal combustion engine is switched off. This requires operation of the accessories transmission by means of the electric machine and disconnection of the crankshaft from the relative pulley.

For this purpose, pulley units are known provided with a hub configured to be fixed to the crankshaft, a pulley, and a clutch interposed between the hub and the pulley, typically driven by means of an electromagnetic actuator. The clutch is generally of the friction type.

The known friction clutches have some drawbacks.

The transmissible torque depends on the actuation load, the friction surfaces and the diameter. Therefore, in order to reduce the clutch dimensions, the actuator dimensions have to be increased and vice versa. It is consequently difficult to find an acceptable compromise between the above-mentioned variables in terms of the overall dimensions, particularly in cases in which the application is made in an already existing engine and is therefore subject to predetermined spatial constraints.

To solve the problem of the overall dimensions, a clutch with front teeth is commonly used, which is able to transmit high powers with relatively compact overall dimensions. However, the use of a clutch with front teeth is undesirable due to the high noise level produced.

DISCLOSURE OF INVENTION

The object of the present invention is the production of a pulley unit that solves or attenuate the problems connected with the known pulley units.

The above-mentioned object is achieved by a pulley unit comprising:
a hub configured to be connected to a crankshaft of a motor vehicle and having an axis;
a pulley coaxial with the hub and supported in a rotationally free manner relative to the same;
a clutch interposed between the hub and the pulley; and
an actuator to control the clutch,
in which the clutch comprises an inner disc rotationally coupled to the hub and having an engagement portion housed inside the pulley and a mobile member movable axially between an engagement position in which it rotationally couples the pulley to the engagement portion of the inner disc and a disengagement portion in which the pulley is rotationally free with respect to the inner disc.

Since the engagement portion of the inner disc is housed inside the pulley, the additional overall dimensions determined by the presence of the clutch are minimized; the total overall dimensions of the pulley unit can therefore be equal to or slightly greater than that of a conventional pulley unit.

Furthermore, the radial overlapping between the pulley and the inner disc allows the use of more silent coupling solutions than the front teeth.

Preferably, the elastic element is subject to the thrust of at least one elastic element towards the engagement portion; in this way the actuator can be single-acting.

Alternatively, a bistable actuator can be used, in which case the elastic element is not necessary.

According to one embodiment of the invention, the clutch comprises a first toothing carried by the pulley and a second toothing carried by the inner disc and defining said engagement portion; respective toothing spaces of said toothings jointly form axial seats when arranged radially facing each other, and the mobile member carries engagement elements cooperating with the seats in the engagement position.

Preferably, the engagement elements cooperate permanently with the toothing spaces of one of the toothings so as to make the mobile member rotationally integral with one of the inner disc and the pulley also in the disengagement position.

This facilitates synchronization in the passage between the disengagement position and the engagement position.

According to a further embodiment of the invention, the pulley unit comprises a torsional vibration damper in which the clutch is integrated.

BRIEF DESCRIPTION OF THE DRAWINGS

For a better understanding of the present invention a preferred embodiment is described below by way of non-limiting example and with reference to the attached drawings, in which.

BEST MODE FOR CARRYING OUT THE INVENTION

Figure 1:
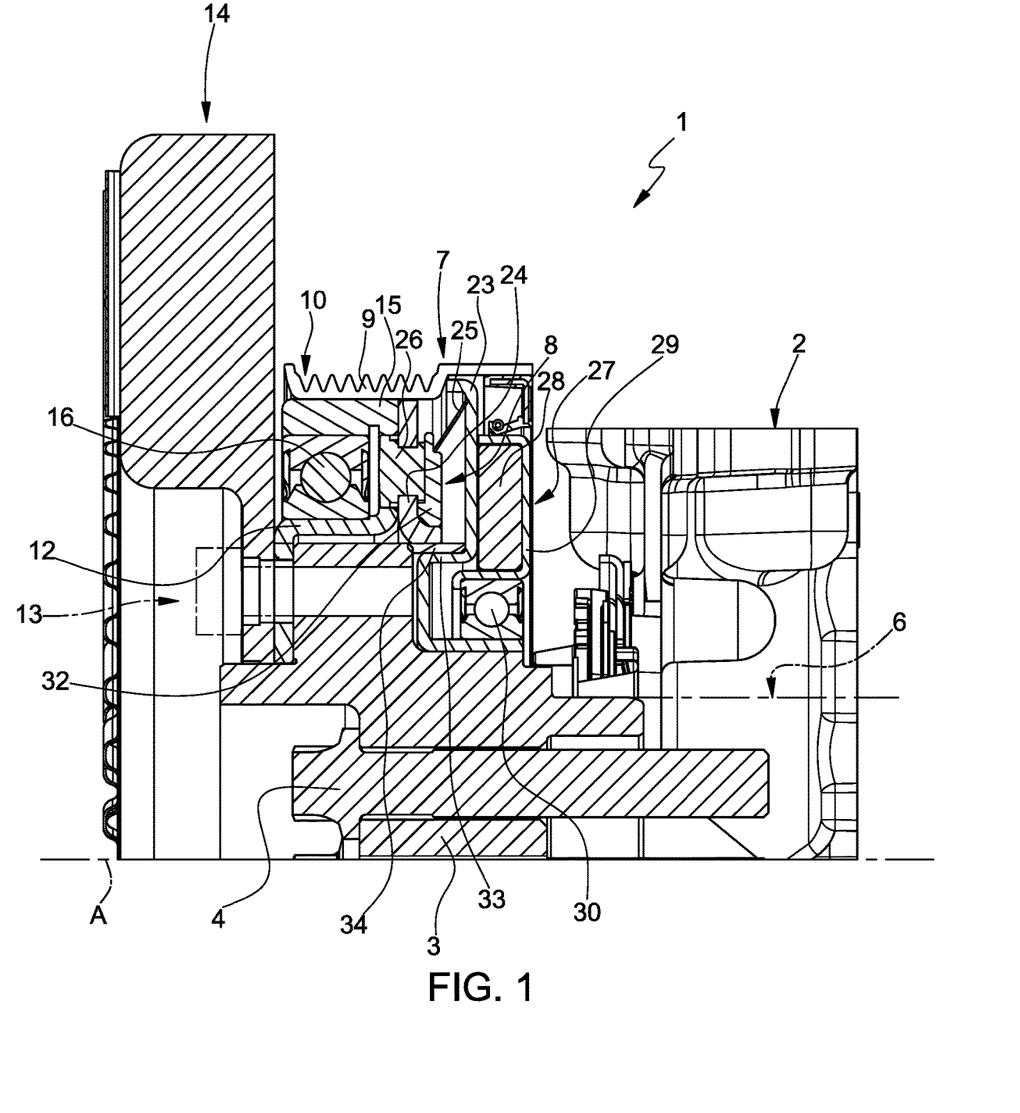
FIG. 1 is a partial axial section of a pulley unit according to a first embodiment of the invention.
Figure 2:
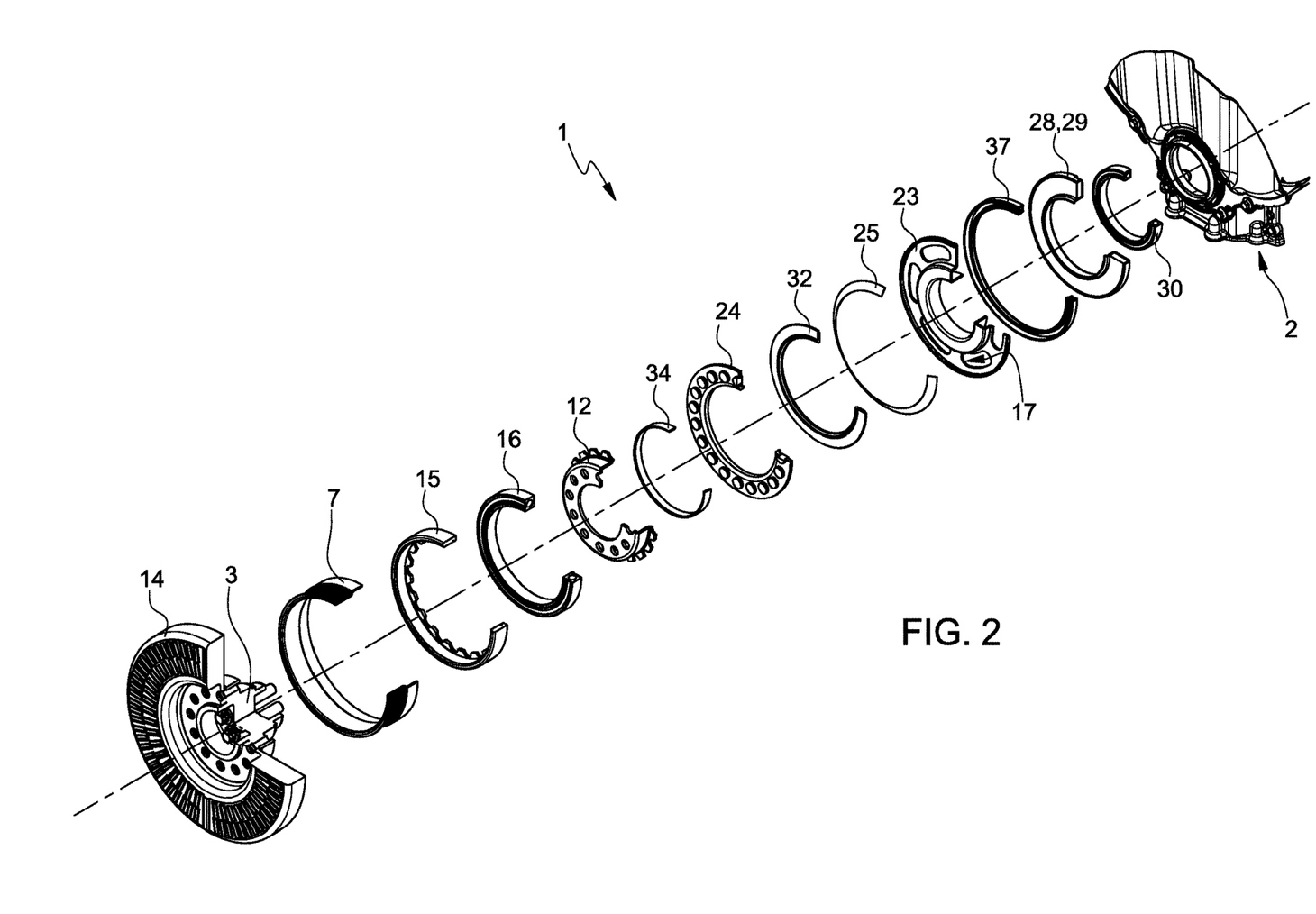
FIG. 2 is a sectioned exploded perspective view of the pulley unit of FIG. 1.

With reference to FIGS. 1 and 2, a pulley unit for an internal combustion engine 2 (partially illustrated) of a motor vehicle is indicated overall by the number 1.

The pulley unit 1 comprises a hub 3 configured to be fixed by means of a plurality of screws 4 to a crankshaft 6 of the engine 2, a pulley 7 and a clutch 8 for selectively coupling/decoupling the pulley 7 to/from the hub 3. The hub 3, the pulley 7 and the clutch 8 have a common axis A coinciding, in use, with the axis of the crankshaft 6.

The pulley 7 comprises an annular crown 9 having externally a multiple-groove profile 10 to cooperate with a poly-V belt (not illustrated) of an accessories transmission.

The clutch 8 comprises an inner disc 12 fixed to the hub 3 by means of a plurality of screws 13 (which tighten in a pack with the inner disc 12 also a torsional vibration damper 14 not forming part of the present invention) and an outer ring 15 supported in an angularly free manner relative to the inner disc 12 by means of a bearing 16. The outer ring 15 is fixed to the crown 9 of the pulley 7, for example by force fitting it into the same.

Figure 3:
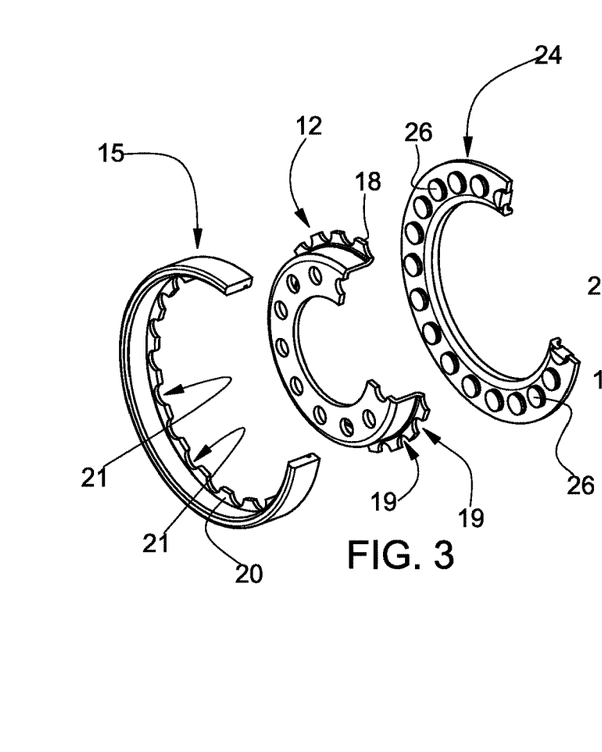
FIG. 3 illustrates elements of a clutch of the pulley unit of FIG. 1, in a sectioned perspective view and on an enlarged scale.
Figure 4:
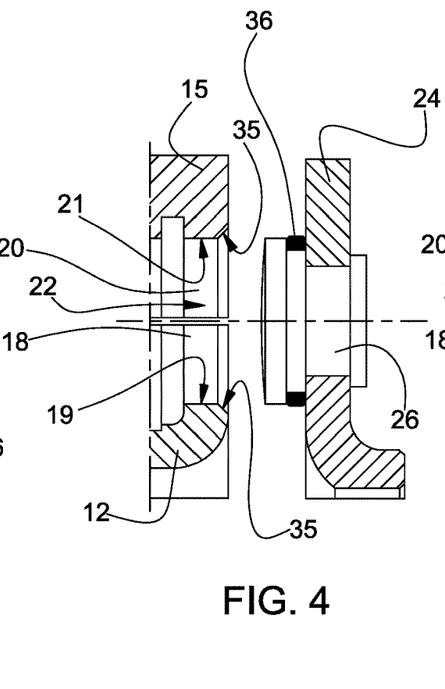
FIG. 4 is a partial section of the elements of FIG. 3.

The inner disc 12 has an outer toothing 18 defining a plurality of toothing spaces 19 with semi-circular profile angularly equally spaced from one another (FIGS. 3 and 4).

The outer ring 15 comprises a corresponding inner toothing 20 defining a plurality of semi-circular toothing spaces 21 angularly equally spaced from one another, in even number and with the same angular pitch relative to the toothing spaces 19 of the outer toothing 18 of the inner disc 12.

Therefore, when the inner disc 12 and the outer ring 15 are angularly synchronized with each other, the toothing spaces 19, 21 of the respective toothings are radially facing each other and jointly form substantially cylindrical seats 22.

The clutch 8 further comprises a primary disc 23 fixed to the hub 3, for example by force fitting, and a secondary disc 24, having annular shape, interposed axially between the inner disc 12 and the outer ring 15 on the one side and the primary disc 23 on the other.

An annular spring 25, for example a disc spring or diaphragm spring or helical spring, is axially interposed between the primary disc 23 and the secondary disc 24 so as to axially thrust the latter towards the inner disc 12 and the outer ring 15. Conveniently, the spring 25 does not come into direct contact with the secondary disc 24, to avoid sliding and wear during the transition periods, but with a thrust ring 32 interposed between the secondary disc 24 and the spring itself.

The secondary disc 24 (FIGS. 3 and 4) is slidingly assembled axially on a collar 33 formed of the primary disc 23 by means of a bushing 34. The secondary disc 24 carries a plurality of axial pins 26 angularly spaced from one another, which are in the same number as the seats 22 and normally engage said seats, with play, under the thrust of the spring 25, keeping the outer ring 15 (and therefore the pulley 7) rotationally connected to the inner disc 12 (and therefore to the hub 3).

The pulley unit 1 lastly comprises an actuator 27, for example an electromagnet, configured to axially move the secondary disc 24, against the action of the spring 25, from the engagement position described above to a release position in which the pins 26 are retracted from the seats 22 and free the inner disc 12 from the crown 9 of the pulley 7.

Although preferably electromagnetic, the actuator could be of other type (for example hydraulic or pneumatic).

In the example illustrated, the electromagnet 27 comprises a coil 28 housed in a fixed cage 29 made of ferromagnetic material. Conveniently, the cage 29 is fixed in use to the engine block by means of a dedicated support (not illustrated) and is supported with respect to the primary disc 23 by a bearing 30. The cage is closed at the front by the primary disc 23, which is conveniently provided with a plurality of openings 17 (FIG. 2) in order not to shield the magnetic flow generated by the coil 28, when excited. The coil 28 is provided with electric terminals, not illustrated, configured to be connected to an electrical system of the vehicle.

The pins 26 are conveniently provided with a convex or conical head 31, the diameter of which is conveniently smaller than that of the seats 22 by a quantity sufficient to take account of the dimensional tolerances and position. Furthermore, to reduce the noise during coupling, the toothing spaces 19, 21 can have flarings 35 on the side facing the secondary disc 24 (FIG. 2). Alternatively, the flarings can be provided on the pins 26.

Again in order to reduce the impact noise both in the engagement phase and in the event of oscillations of the torque transmitted, the pins 26 have, in a position adjacent to the secondary disc 24, circumferential seats housing respective elastic annular elements 36, for example in the form of O-rings made of elastomeric material.

The unit 1 is conveniently grease-lubricated. In order to retain the grease, a seal 37 is arranged between the cage 29 and the pulley 7.

The operation of the pulley unit 1, already partly evident from the above description, is as follows.

In the absence of excitation of the coil 28, the spring 25 maintains the secondary disc 24 in an advanced engagement position with the toothing spaces 19, 21 of the inner disc 12 and the crown 9. When the coil 28 is excited, the secondary disc 24 of the clutch 8 is axially attracted and sets to the release position in which the pins 26 are extracted from the seats 22 of the pulley 7. In this position, the crown 9 is free with respect to the inner disc 12 and can rotate, driven by the accessories drive belt, even if the crankshaft 6 is at a standstill.

In this way it is possible to drive the conditioning system compressor even when the internal combustion engine is switched off.

When the coil 28 is de-energized, the thrust of the spring 25 re-sets the secondary disc 24 to the engagement position, and the pulley 7 is again coupled to the crankshaft. The coupling is facilitated by the flarings 35 and can take place in conditions of substantial synchronization between the pulley and the crankshaft appropriately controlling the electric machine of the accessories transmission. The presence of the elastic annular elements 36 further reduces the noise level of the coupling.

Figure 5:
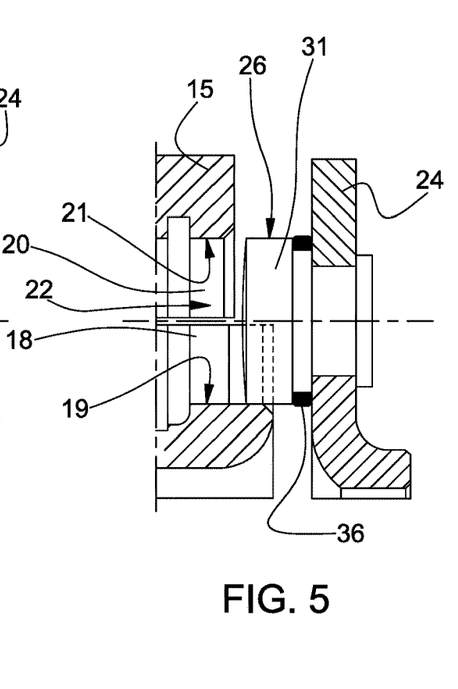
FIG. 5 is a partial section similar to that of FIG. 4 of a variation of the unit of FIG. 1.

FIG. 5 illustrates an embodiment variation of the pulley unit 1, in which the pins 26 are permanently meshed with the toothing 18 of the inner disc 12.

For this purpose, the toothing 18 and the heads 31 of the pins have a greater axial extension so as to have an engagement zone even when the secondary disc 24 is in the release position.

In this way, in the passage from the release position to the engagement position, only the synchronization between the secondary ring 24 and the crown 9 is necessary, and the engagement manoeuvre is facilitated and more silent.

Figure 6:
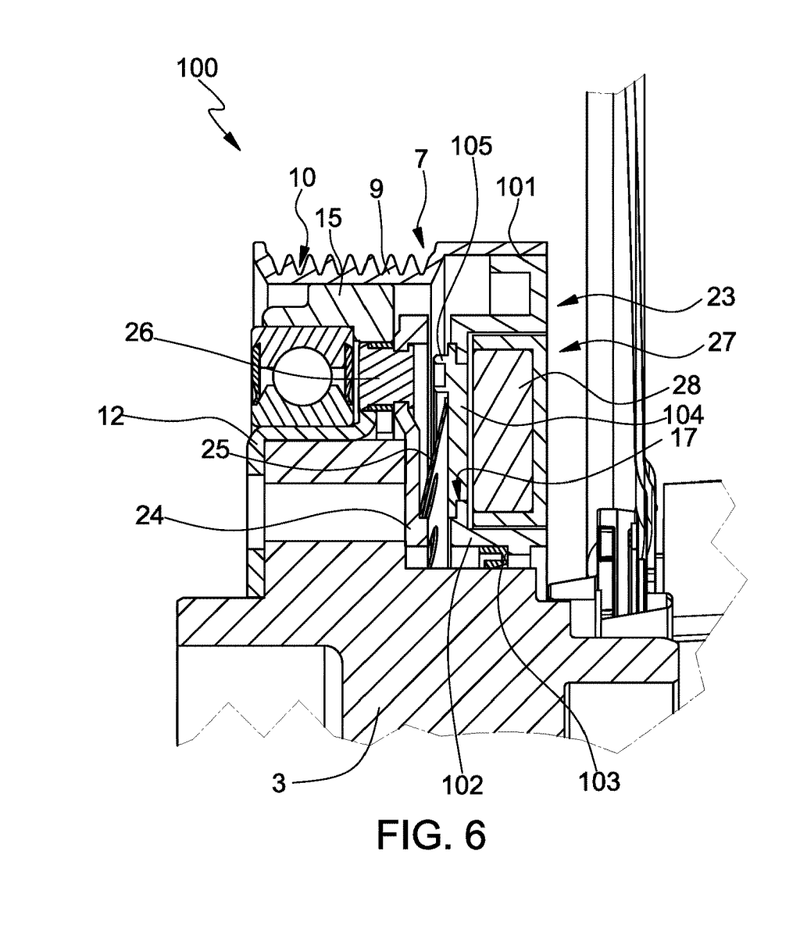
FIGS. 6 and 7 are partial axial sections of a second embodiment of the invention, in two different operating positions.
Figure 7:
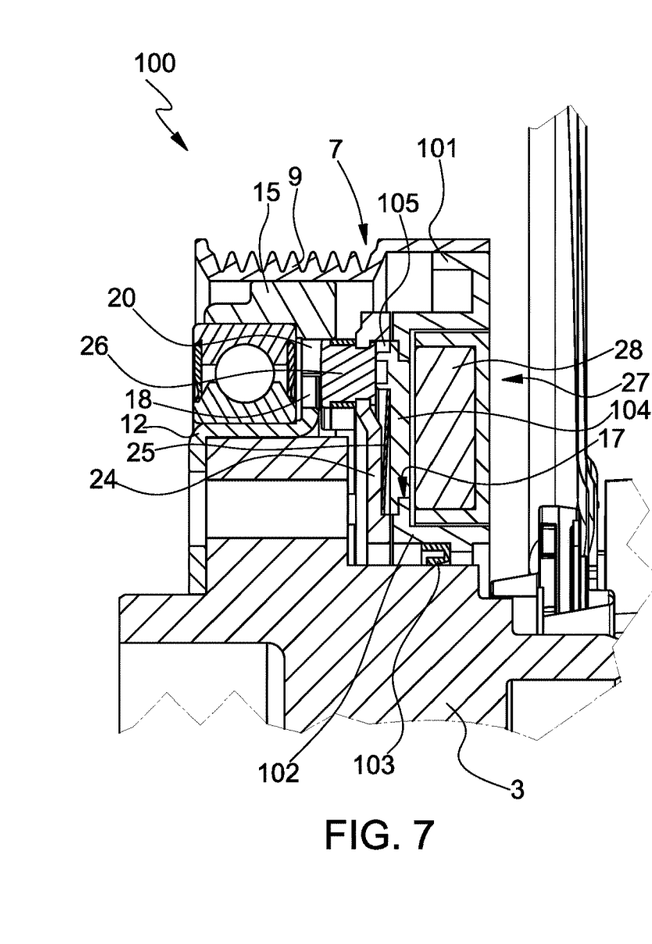

FIGS. 6 and 7 illustrate a second embodiment of the invention, indicated overall by the number 100, which is described below only in the parts that differ from the unit 1 described. Parts equal to or corresponding to parts already described are indicated below by the same reference numbers.

In this solution, the primary disc 23 is integral with the pulley 7, instead of with the hub 3. In particular, the primary disc has an outer peripheral edge 101 force fitted into the crown 9 and a tubular inner peripheral edge 102 coaxial to the hub 3; a seal 103 is interposed between the inner peripheral edge 102 and the hub 3.

Also in this case the primary disc 23 is provided with a plurality of openings 17, which are closed frontally by an annular plug 104 made of plastic material, in order not to shield the magnetic flow which re-closes through the secondary ring 24 as in the solution of FIG. 1.

In this case, however, the secondary ring 24 is rotationally integral with the pulley 7 by means of a permanent coupling between the pins 26 and the inner toothing 20 of the outer ring 15, according to a solution similar to the one described with reference to FIG. 5 but inverted.

The magnetic circuit therefore consists of a fixed part (the cage 29 of the coil 28) and a rotating part formed of the primary disc 23 and the secondary ring 24, and there is no contact between the actuator 27 and the secondary ring 24. Therefore the transmission of the actuation load does not require the use of a bearing between the fixed part and the rotating part.

The spring 25 in this case is interposed between the secondary ring 24 and the plug 104, which are rotationally fixed to each other; therefore, the spring 25 is not subject to sliding and wear is avoided.

The plug 104 has an annular projection 105 configured to cooperate with the pins 26 in the disengagement position (FIG. 7) of the secondary ring 24 due to the magnetic attraction of the coil 28, so as to attenuate the actuation noise.

Figure 8:
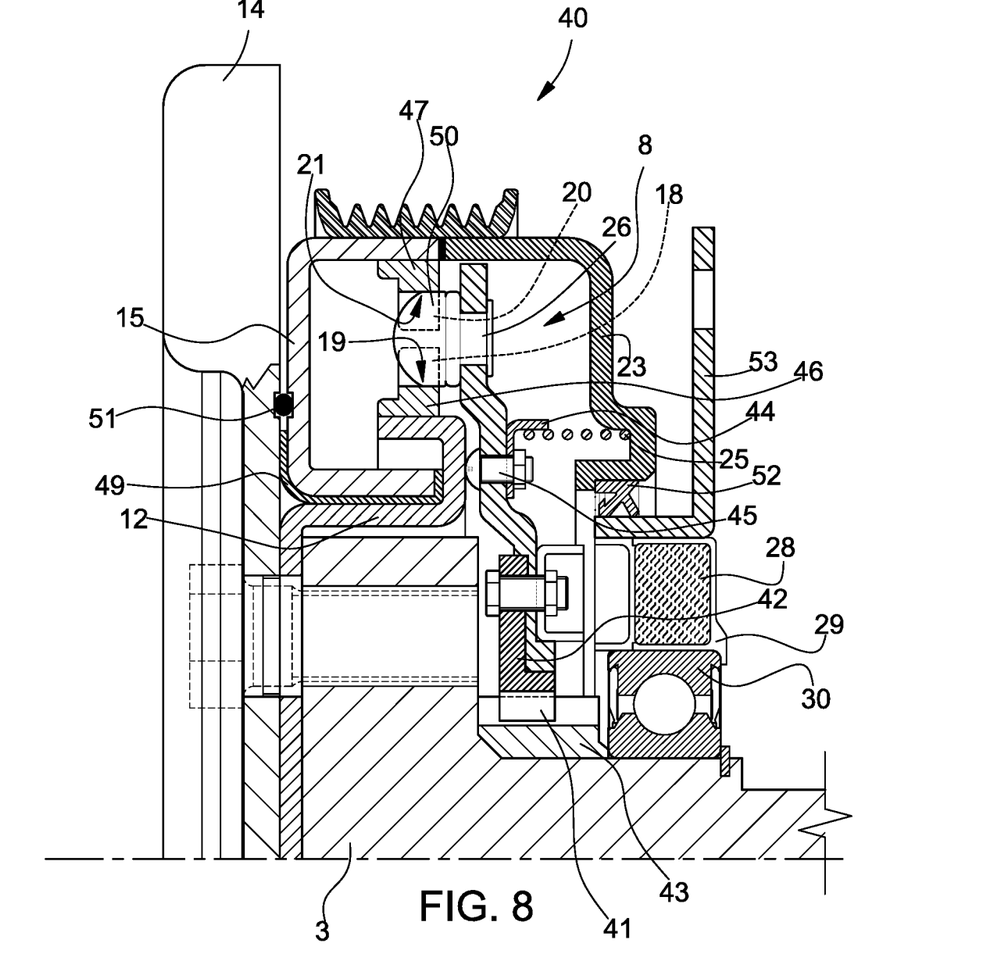
FIG. 8 is a partial axial section of a third embodiment of the present invention.

FIG. 8 illustrates a further embodiment variation, indicated overall by the number 40, which is described below only in the parts that differ from the unit 1 described. Parts equal or corresponding to parts already described are indicated below by the same reference numbers.

In the unit 40, the secondary disc 24 is guided internally on the hub 3 by means of a grooved coupling 41. Conveniently, the grooved coupling is provided between an outer annular element 42 fixed to an inner periphery of the secondary disc 24 and a spacer 43 force fitted into the hub 3 and axially interposed between a shoulder of the latter and the bearing 30.

In the pulley unit 40 the spring 25 consists of a helical spring interposed between the primary disc 23 and a cup 44 fitted on the secondary disc 24 by means of a riveting 45.

The toothings 18, 20 of the inner disc 12 and the outer ring 15 are furthermore provided on respective rings 46, 47 pressed onto the same, conveniently by force fitting. The outer ring 15 has a C-shaped section, and is supported internally on the inner disc 12 by means of a bushing 49 made of plastic material with low friction coefficient.

The pins 26 are provided with heads 50 with a spherical front profile, in order to facilitate the coupling with the toothing 18, 20.

The unit 40 is grease-lubricated. To prevent dirt from entering and grease from leaking out, gaskets 51, 52 are provided between the outer ring 15 of the clutch 8 and the damper 14, and between the primary disc 23 and a fixing plate 53 of the cage 29 of the coil 28 to the engine block.

The operation of the unit 40 is analogous to that of the unit 1 described.

Figure 9:
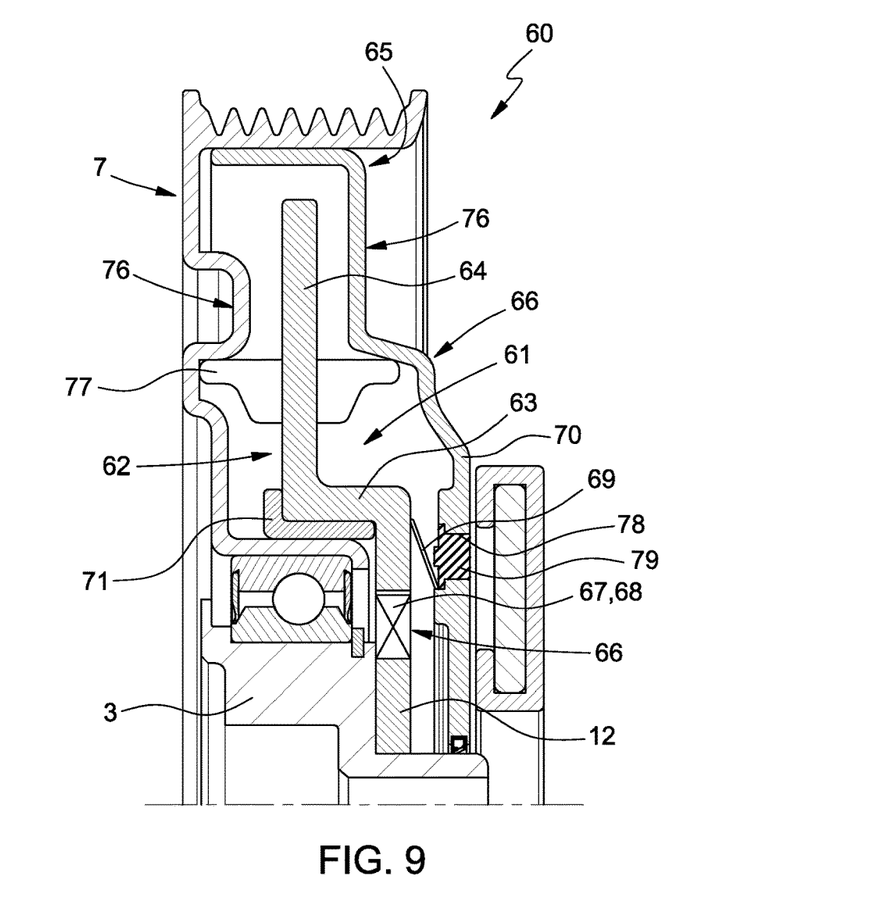
FIG. 9 is a partial axial section of a fourth embodiment of the present invention.

FIG. 9 illustrates a third embodiment of the present invention, indicated overall by the number 60.

The pulley unit 60 comprises a filtering unit 61 comprising a drive member 62 having an inner disc 12 integral with the hub 3 and an outer ring 63 provided with a plurality of radial spokes 64, conveniently two. The filtering unit 61 further comprises an outer casing 65 formed of two half-shells, one of which consists of the pulley 7 and the other of a cover 66 force fitted into the crown 9 of the pulley.

The inner disc 12 and the outer ring 63 can be selectively coupled to each other by means of a sliding toothed coupling 66, formed of an outer toothing 66 of the inner disc 12 and an inner toothing 67 of the outer ring 63. The outer ring 63 is movable between an engagement position illustrated in FIG. 9 and a disengagement position, not illustrated. A disc spring 69 interposed between the outer ring 63 and an axial end wall 70 of the cover keeps the outer ring 63 normally against an end stop 71 fixed to the pulley 7.

Figure 10:
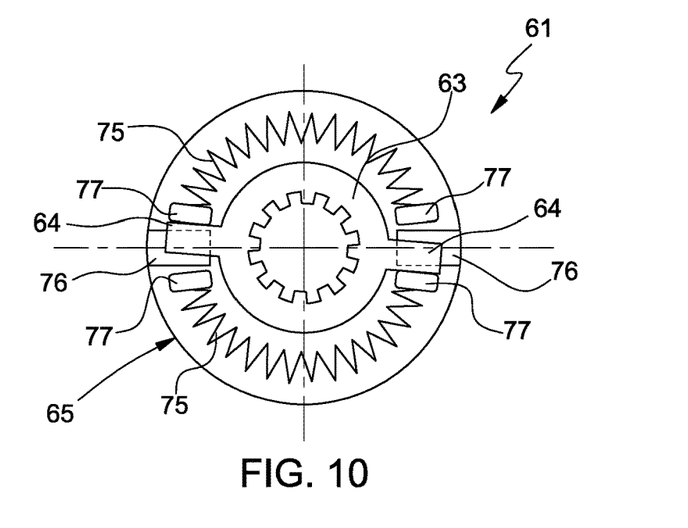
FIG. 10 is a drawing of a component of the pulley unit of FIG. 9.

Circumferential arc springs 75 are arranged between the spokes 64 and the casing 65 (see also FIG. 10). For this purpose, the casing 65 forms protrusions 76 providing a shoulder for the springs. Conveniently, the springs 75 have ends housed in sliding blocks 77 which cooperate with the spokes 64 and with the protrusions 76.

Based on the above, the coupling of the outer ring 63 with the pulley 7 is not rigid but provided through the springs 75.

The pulley unit 60, similarly to what is described for the unit 1, comprises an electromagnetic actuator 27 provided with an annular coil 28 arranged in a fixed position, facing an outer side of the wall 68 of the cover 65.

The wall 68 is provided with a plurality of openings 78, which are closed frontally by an annular plug 79 made of plastic material, in order to prevent the magnetic flow generated by the coil 28 from re-closing through the wall 68, and to allow the magnetic flow to reach the outer ring 62 and re-close through the same.

Therefore the coil 28, when excited, attracts the outer ring 62 towards the wall 69 against the action of the spring 68, thus decoupling the inner disc 12 from the outer ring 62.

Also in this case, as in the solution of FIGS. 6 and 7, there is no contact between the fixed part and the rotating part of the magnetic circuit.

The operation of the unit 60, partly evident from the above description, is the following.

In the absence of excitation of the coil 28, the spring 68 keeps the outer ring 63 in the engagement position. In this position, the pulley 7 is rotationally coupled to the hub 3 through the springs 75 of the filtering unit 70, which filter the torsional vibrations of the crankshaft.

When the coil 28 is excited, the secondary disc 24 of the clutch 8 is axially attracted and goes to the release position. In this position, the crown 9 is free with respect to the inner disc 12 and can rotate, driven by the accessories drive belt, even if the crankshaft 6 is at a standstill.

Lastly it is clear that modifications and variations that do not depart from the scope defined by the claims can be made to the pulley units 1, 100, 40, 60 described. In particular, the units 1, 40 can be provided with a filtering unit like the unit 60 in place of the torsional vibration damper 14.

The invention claimed is:

1. A pulley unit comprising:
a hub configured to be connected to a crankshaft of a motor vehicle and having an axis (A);
a pulley coaxial to the hub and supported in a rotationally free manner with respect to the hub;
a clutch interposed between the hub and the pulley; and
an actuator for controlling the clutch,
characterized in that the clutch includes an inner disc rotationally coupled to the hub and having an engagement portion housed inside the pulley, and a mobile member movable axially between an engagement position in which the pulley is rotationally coupled to the engagement portion of the inner disc and a disengagement position in which the pulley is rotationally free with respect to the inner disc,
wherein the engagement portion includes a toothing.

2. The pulley unit according to claim 1, characterized by including at least one elastic element acting at least indirectly on the mobile member to bias it towards the engagement position.

3. The pulley unit according to claim 1, characterized in that the toothing of the clutch includes a first toothing carried by the pulley and a second toothing carried by the inner disc and defining said engagement portion, respective toothing spaces of said toothings jointly forming axial seats when arranged radially facing each other; the mobile member carrying engagement elements cooperating with said seats in said engagement position.

4. The pulley unit according to claim 3, characterized in that the engagement elements cooperate permanently with the toothing spaces of one of the said toothing in such a way as to make the mobile member rotationally fixed to one of the inner disc and the pulley also in the disengagement position.

5. The pulley unit according to claim 3, characterized in that the toothing spaces have a substantially semicircular profile and the seats are cylindrical, and in that the engagement elements are axial pins carried by the mobile member.

6. The pulley unit according to claim 5, characterized by including elastic elements interposed between the pins and the respective seats in the engagement position.

7. The pulley unit according to claim 3, characterized by including pilot elements to facilitate the engagement of the engagement elements in the seats.

8. The pulley unit according to claim 3, characterized in that the first toothing is carried by an annular element coupled internally to the pulley.

9. The pulley unit according to claim 8, characterized in that the annular element is supported on the inner disc by a bearing or bushing.

10. The pulley unit according to claim 1, characterized in that the mobile member is a disc coaxial to the hub.

11. The pulley unit according to claim 10, characterized in that said disc is guided to slide on the hub or on an additional disc carried by the hub.

12. The pulley unit according to claim 1, characterized by including a filtering unit configured to filter torsional vibrations.

13. The pulley unit according to claim 12, characterized in that the filtering unit includes a drive member equipped with the inner disc and a plurality of radial spokes which are couplable to the pulley by means of a plurality of circumferential springs.

14. The pulley unit according to claim 13, characterized in that the spokes are carried by an outer ring separated from the inner disc and selectively couplable thereto by the clutch.

15. The pulley unit according to claim 14, characterized in that the clutch comprises a sliding toothed coupling between the inner disc (12) and the outer ring.

16. The pulley unit according to claim 15, characterized in that the outer ring of the drive element constitutes said movable element.

17. A pulley unit comprising:
a hub configured to be connected to a crankshaft of a motor vehicle and having an axis (A);
a pulley coaxial to the hub and supported in a rotationally free manner with respect to the hub;
a clutch interposed between the hub and the pulley; and
an actuator for controlling the clutch, and
characterized in that the clutch includes an inner disc rotationally coupled to the hub and having an engagement portion housed inside the pulley, and a mobile member movable axially between an engagement position in which the pulley is rotationally coupled to the engagement portion of the inner disc and a disengagement position in which the pulley is rotationally free with respect to the inner disc,
the actuator comprising an electromagnet housed in a fixed position and an armature rotating around the axis of the hub.

18. The pulley unit according to claim 17, characterized in that the moving member consists of the armature of the electromagnet.

19. The pulley unit according to claim 18, characterized by including a member rotating rigidly with the pulley and interposed axially between the electromagnet and the mobile member.

20. A pulley unit comprising:
a hub configured to be connected to a crankshaft of a motor vehicle and having an axis (A);
a pulley coaxial to the hub and supported in a rotationally free manner with respect to the hub;
a clutch interposed between the hub and the pulley;
an actuator for controlling the clutch, and
a filtering unit configured to filter torsional vibrations;
characterized in that the clutch includes an inner disc rotationally coupled to the hub and having an engagement portion housed inside the pulley, and a mobile member movable axially between an engagement position in which the pulley is rotationally coupled to the engagement portion of the inner disc and a disengagement position in which the pulley is rotationally free with respect to the inner disc.

* * * * *